AUTOMATICALLY ADJUSTABLE CARRIAGE STOP FOR MACHINE TOOLS
Filed Jan. 8, 1964
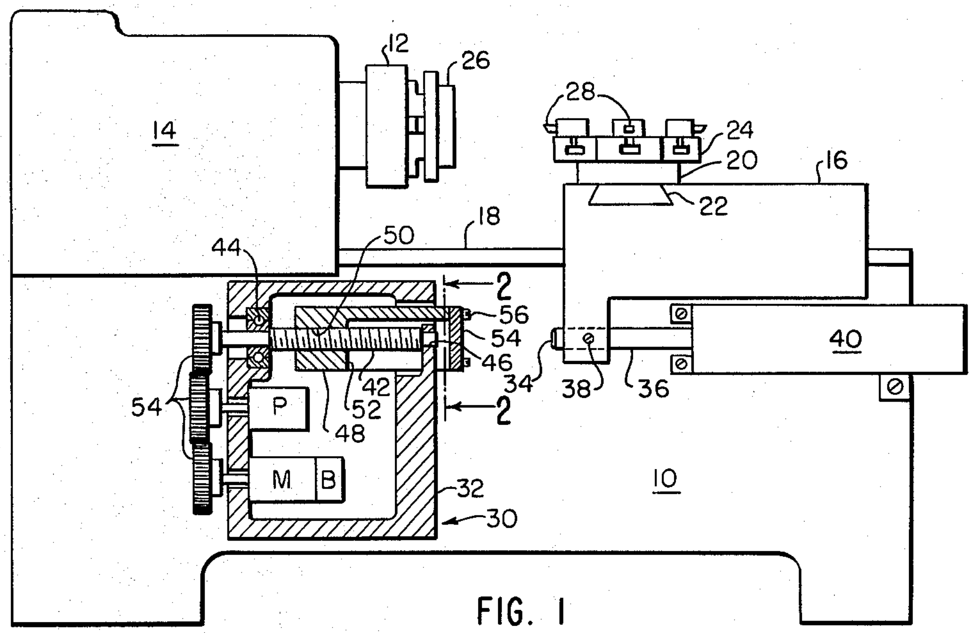
FIG. 1
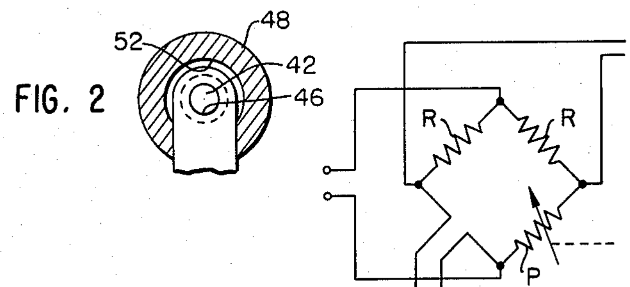
FIG. 2
FIG. 4
FIG. 3
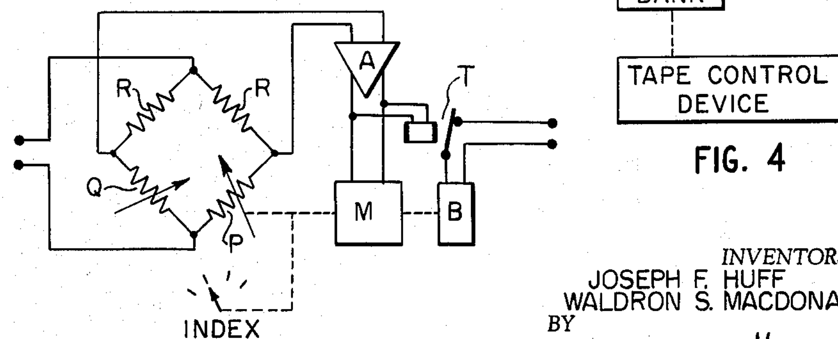
INVENTORS
JOSEPH F. HUFF
WALDRON S. MACDONALD
BY
Kenway Jenney & Hildreth
ATTORNEYS

United States Patent Office 3,259,002
Patented July 5, 1966

1

3,259,002

AUTOMATICALLY ADJUSTABLE CARRIAGE STOP FOR MACHINE TOOLS

Joseph F. Huff, Hyde Park, and Waldron S. Macdonald, Concord, Mass., assignors to Northrop Corporation, Beverly Hills, Calif., a corporation of California Filed Jan. 8, 1964, Ser. No. 336,466
5 Claims. (Cl. 82—21)

This invention relates to an improved automatically adjustable carriage stop for machine tools and has as its primary object the provision of an improved stop mechanism which can be automatically adjusted to limit feeding motions of a machine tool carriage at predetermined locations for carrying out multiple machining operations. It is another object of the invention to provide an automatically adjustable stop mechanism for machine tool carriages or tables by means of which terminal positions of the carriage or table may be preselected precisely and accurately, without limitation of the fineness of increments between successive terminal positions. It is a further object of the invention to provide a versatile stop mechanism which can be manually reset without interrupting machining operations; and which is readily adapted for control by tape-control means.

For the performance of multiple machining operations by means of a turret lathe or the like, in which successive cutting operations are to be terminated at various tool positions, a conventional stop mechanism comprises a plurality of adjustable stop screws mounted on a rotatable support. Each screw is preset to a given terminal position, and the support is rotated after each cutting operation to bring a successive stop screw into operative position for abutment with the tool carriage. This arrangement is satisfactory for a single repetitive machining operation, but the stops must be individually reset when the machining cycle is to be altered, and considerable skill and loss of operating time are required to set the stops accurately.

According to the present invention, a single stop is mounted movably along the path of translation of a machine carriage or table, and arranged to be positioned by electrically-controlled reversible motive means. The tool carriage is driven by a fluid motor, rather than by a positive drive or lead screw. In a preferred embodiment, the stop is adjusted to a preselected terminal position in advance of the arrival of the machine carriage or table at that position, and halts the movement of the carriage or table against the driving force of the fluid motor. In an alternative form, however, the stop may be used to drive the carriage or table to the terminal position.

For automatically positioning the movable stop at a preselected location, where the highest precision is required, we prefer to employ a digital servomechanism of the type shown and described in co-pending United States application Serial No. 336,475, filed on the same day as the present application by Waldron S. Macdonald, for Digital Servomechanism, and assigned to the assignee of our invention. However, many of the advantages of our invention can be realized in embodiments incorporating other forms of servomechanisms comprising less complex forms of control for the motive means. For example, chosen both for simplicity and for certain specific advantages to appear, according to one form of the invention, we may energize the motive means by means of a bridge circuit, which includes a first variable resistance means having an armature drivingly connected with the motive means, to adjust its resistance as a function of the position of the driven stop. The bridge circuit further includes a second variable resistance means which is independently adjustable, manually or by automatic means such as a tape-control device; these means are set to a resistance value corresponding to a desired stop position. This setting results in an unbalanced condition in the bridge and the production of a signal voltage, which is then amplified and supplied to energize the motor for driving the stop in a direction to correct the imbalance. The value of the signal voltage will be in proportion to the displacement of the stop from the newly-selected position, and will diminish as the final setting is approached, being nulled in that position by the re-balanced condition of the bridge circuit.

In one form of the invention, the stop is driven by a lead screw, which is drivingly connected by a gear set with both the stop-positioning motive means, and the armature of the position-responsive variable resistance means. A further feature of this embodiment is the provision of means for automatically locking the system mechanically when the stop has reached the selected position. These means may comprise an electromagnetic brake, which is connected for energization by the bridge circuit only when the circuit is in balance and the stop is in the preselected position. The braking means secure the stop in the selected position against the load applied by the tool carriage feed motor. The lack of torque application by the stop-positioning motive means when the circuit is in balance may require this provision where the speed ratio of the gearing connecting the stop-positioning motive means with the lead screw is not sufficiently large to prevent excessive displacement of the stop by the tool carriage.

The improved system provides accurate automatic selection of carriage stop positions, without limitation of the fineness of increments between successive positions. Further, the selection of stop position by variable resistance means provides versatility in the manner of control. The system may, for example, be manually controlled by means of a dial graduated in linear measurement, or may be controlled by a tape system. The latter may be arranged for selecting, from a group of fixed resistances, a composite bridge circuit resistance corresponding to any desired stop position, thereby making available a large number of fine incremental steps. Alternatively, conventional circuitry for supplying control signals from the tape mechanism may be used to initiate movement of the stop, and a stop position signal compared with the control signal for terminating this movement at the selected position.

While the specification concludes with claims particularly pointing out the subject matter which we regard as our invention, it is believed that a clearer understanding may be gained from the following detailed description of a preferred embodiment thereof, referring to the accompanying drawing, in which:

FIG. 1 is a schematic view in elevation, and partially in cross-section, of an illustrative turret lathe operatively associated with the improved stop mechanism;

FIG. 2 is a fragmentary sectional view of a movable stop, taken along line 2—2 in FIG. 1, looking in the direction of the arrows;

FIG. 3 is a circuit diagram showing control means for the stop mechanism; and

FIG. 4 is a fragmentary circuit diagram showing alternative components for use in the circuit of FIG. 3.

The improved stop mechanism is shown in FIG. 1 operatively associated with an illustrative turret lathe, including a bed 10, a spindle 12, a spindle housing 14, a longitudinal feed carriage 16 slidably received on dovetail ways 18, a cross-feed carriage 20 slidably received in dovetail ways 22, and a tool-mounting turret 24 supported on the cross-feed carriage. In a conventional manner, a workpiece to be machined can be secured in a chuck 26 for rotation with the spindle 12, and a series of tools 28 are mounted in the turret 24, which is arranged to be indexed to bring succesive tools to bear on the work for multiple machining operations.

The stop mechanism, generally designated at 30, is organized within a casing 32 mounted on the lathe bed 10, for cooperation with an abutment 34 terminating a carriage drive shaft 36, which is secured to the longitudinal feed carriage 16 as by means of a bolt 38. The tool carriage is drivingly connected by the shaft 36 with a carriage-positioning motor 40, which may preferably be hydraulically or pneumatically actuated. It will be understood that a similar motor is provided for driving the cross-feed carriage 20 to position the tools on transverse axes, and that a similar stop mechanism may be provided for the cross-feed carriage. However, these elements are substantially the same as those shown in conjunction with the longitudinal feed carriage, and are not shown in the drawing in the interest of greater clarity.

The stop mechanism 30 includes a lead screw 42 rotatably mounted in the casing 32 by means of a bearing unit 44 capable of supporting radial and thrust loadings, and a plain bearing 46 formed in the casing. A stop 48 is threaded on the lead screw at 50, and is formed with a longitudinally-extending recess 52 to permit translation along the axis of movement of the carriage 16. For convenience in assembly, an abutment plate 53 is formed as a separate part, being attached to the stop 48 by screws 56. It will be apparent that the stop may be translated longitudinally by rotation of the lead screw to any desired terminal position, at which the tool carriage will be halted by the abutment of the elements 34 and 53, against the force applied by the motor 40.

For positioning the stop, electrically-controlled motive means, comprising a reversible motor M, are mounted in the housing 32, and drivingly connected with the lead screw 42 through a gear train comprising a set of intermeshed gears 54. One of these serves to drive the armature of a variable resistance means, comprising a multiturn potentiometer P, whose resistance is thereby adjusted in response to movement of the stop, and is a function of its position. An electromagnetic brake B is conveniently mounted on the housing of motor M, and connected to its shaft.

The potentiometer P is connected as one arm of the bridge circuit shown in FIG. 3. A second arm of the bridge circuit comprises an independently-adjustable resistance means, which in the embodiment shown comprises a manually-adjustable potentiometer Q. The bridge is completed by fixed resistor R of equal values. In a balanced condition of the bridge, corresponding to a setting of the potentiometer Q equivalent to the current location of the stop, energization of the circuit produces no output signal. If now the potentiometer Q is readjusted to select a different stop position, the imbalance of the circuit produces an output signal voltage, which is supplied to an amplifier A and thence to energize the motor M. The value of the energization voltage depends upon the magnitude of displacement of the stop from the selected position, and diminishes as the motor actuates the lead screw in a direction to drive the stop and potentiometer P to a selected position. When the bridge is re-balanced, coincident with the arrival of the stop at the newly-selected terminal position, the motor M is de-energized.

In the illustrated embodiment, the electromagnetic brake B drivingly connected with the shaft of the motor M, is energized through a normally-closed relay T. The coil of the relay is connected in parallel with the motor M, so that upon the establishment of a signal voltage to move the stop, the relay opens to de-energize the brake B. Thus, the brake becomes operative only when the bridge is balanced and the stop has obtained a selected position. Braking action is desirable in this position to prevent the carriage drive motor 40 from displacing the stop as the elements 34 and 53 abut. However, braking means may be omitted where the speed ratio of the gear train connecting the motor M with the lead screw 42 is sufficiently great to prevent reverse actuation.

In an alternative form, as illustrated in FIG. 4, the manually-adjustable potentiometer Q may be replaced by other variable resistance means, such as a bank of fixed resistors from which a composite resistance may be selected by a tape-control device or other such device. Other forms of circuitry, as will be understood by those skilled in the art, may be utilized for comparison of a position-selection signal with a position-responsive signal, and for energizing stop-adjusting motive means to balance these signals and thus adjust the stop to a selected position.

The improved stop mechanism is thus adaptable to tape controlled machine tools, in which the remaining machine operations are also selected by tape signals.

While we have illustrated and described a preferred embodiment of the invention by way of illustration, it will be apparent to those skilled in the art that various changes and modifications may be made without departing from the true spirit and scope of the invention, which we therefore intend to define in the appended claims without limitation to the details of the foregoing embodiment.

What we claim is:

1. In a machine tool, a carriage supported for movement along a path; motive means for driving said carriage along said path; and a stop mechanism for said movable carriage, comprising a stop supported for movement along the path of said carriage for abutment therewith at preselected stop positions, further motive means drivingly connected for reversible adjusting movement of said stop along said path, first signal means responsive to the position of said stop, and independently-adjustable second signal means; said first and second signal means being connected for comprising the position of said stop with a stop position selected by said second signal means and for actuating said further motive means, when said positions do not coincide, in a direction to adjust said stop to the selected position, said carriage motive means are constructed and arranged to drive said carriage impositively and continuously into abutment with said stop, whereby movement of said stop directly re-positions said carriage.

2. In a machine tool, a carriage supported for movement along a path; motive means for driving said carriage along said path; and a stop mechanism for said movable carriage, comprising a stop supported for movement along the path of said carriage for abutment therewith at preselected stop positions, further electrically-controlled motive means drivingly connected for reversible adjusting movement of said stop along said path, first variable resistance means having an armature drivingly connected with said further motive means for adjustment of the resistance of said first means as a function of the position of said stop, and independently-adjustable second variable resistance means; said first and second variable resistance means being connected in separate arms of a bridge circuit for energizing said further motive means upon imbalance of said bridge circuit produced by an independent adjustment of said second variable resistance means, whereby said further motive means rebalance said bridge circuit to adjust the position of said stop.

3. The combination recited in claim 2, in which said second variable-resistance means comprises a potentiometer having an index scale indicative of corresponding stop positions.

4. The combination recited in claim 2, in which said second variable-resistance means comprises a bank of graduated fixed resistors, and means for connecting a selected group of said resistors in an arm of said bridge circuit.

5. The combination recited in claim 2, together with electrically-controlled brake means drivingly connected with said further motive means, and normally-closed relay means for energizing said brake means, said relay means being connected for opening by said bridge circuit in an unbalanced condition thereof, whereby said brake means locks said stop in pre-selected positions.

References Cited by the Examiner

UNITED STATES PATENTS

| | | | |
|---|---|---|---|
| 2,489,725 | 11/1949 | Rutemiller. | |
| 2,748,665 | 6/1956 | Senn. | |
| 2,916,931 | 12/1959 | Cunningham -------- | 82—21 X |
| 3,103,148 | 9/1963 | Le Brusque. | |

WILLIAM W. DYER, Jr., *Primary Examiner.*

ANDREW R. JUHASZ, *Examiner.*

L. VLACHOS, *Assistant Examiner.*